W. R. AND J. M. FREEMAN.
CLEVIS.
APPLICATION FILED FEB. 7, 1921.

1,392,138.

Patented Sept. 27, 1921.
2 SHEETS—SHEET 1.

William R. Freeman
James M. Freeman
INVENTORS

BY *Victor J. Evans*
ATTORNEY

WITNESS:

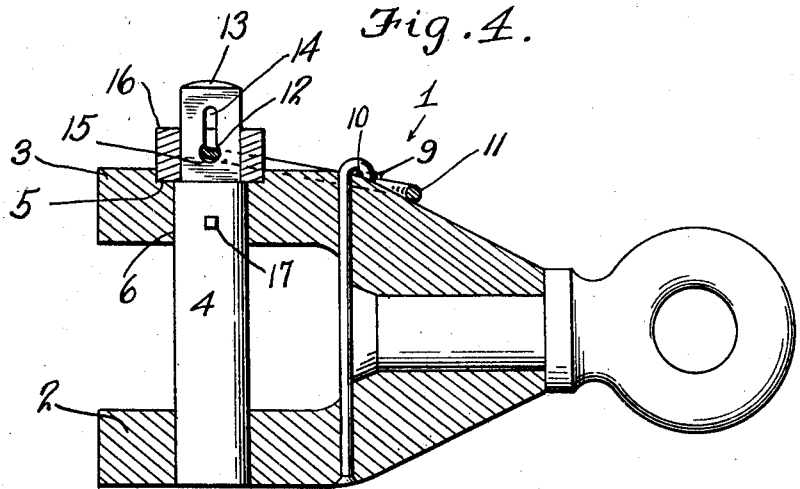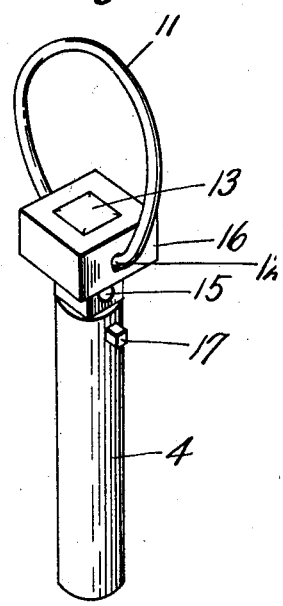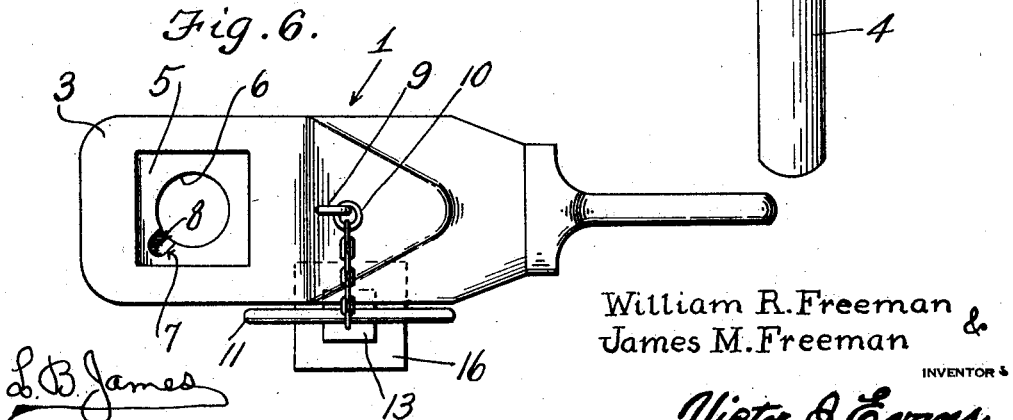

UNITED STATES PATENT OFFICE.

WILLIAM R. FREEMAN AND JAMES M. FREEMAN, OF WASHOE, MONTANA.

CLEVIS.

1,392,138. Specification of Letters Patent. Patented Sept. 27, 1921.

Application filed February 7, 1921. Serial No. 443,269.

*To all whom it may concern:*

Be it known that we, WILLIAM R. FREEMAN and JAMES M. FREEMAN, citizens of the United States, residing at Washoe, in the county of Carbon and State of Montana, have invented new and useful Improvements in Clevises, of which the following is a specification.

The present invention has reference to improvements in clevises and couplings.

The primary object is to provide means between the locking pin and the clevis for automatically securing the latter to the former, the said means also permitting the ready withdrawal of the pin when desired.

It is a further object to produce a clevis or coupling and the pin therefor with means of an extremely simple construction for locking the latter to the former, in which no springs or analogous resilient means are provided, but wherein a locking ring and block retain the pin in locked position.

The foregoing, and other objects which will appear as the nature of the invention is better understood, may be accomplished by a construction, combination and operative arrangement of parts, such as is disclosed by the drawings which accompany and which form part of this application.

In the drawings:—

Fig. 4 is a sectional view approximately on the line 4—4 of Fig. 2.

Fig. 5 is a sectional view on the line 5—5 of Fig. 1.

Fig. 6 is a plan view of the clevis or coupling with the locking pin removed.

Fig. 7 is a perspective view of the locking pin, with the locking block and ring thereon.

Figure 1:
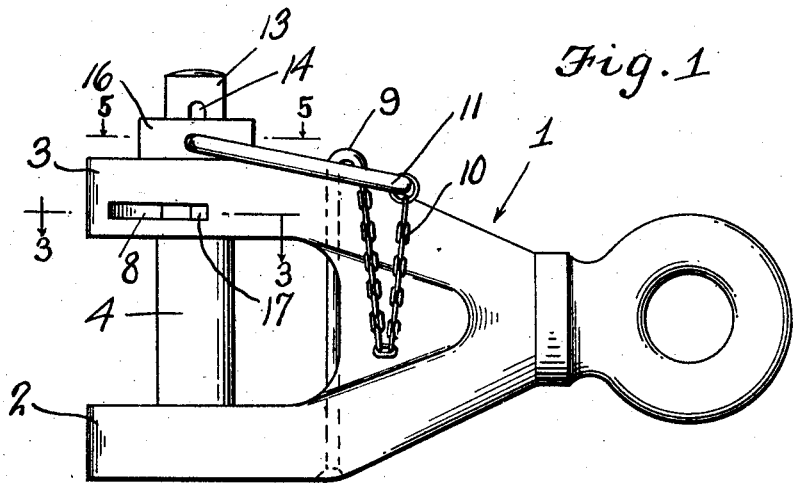
Figure 1 is a side elevation of a clevis or coupling having its pin locked between the jaws thereof in accordance with this invention.
Figure 2:
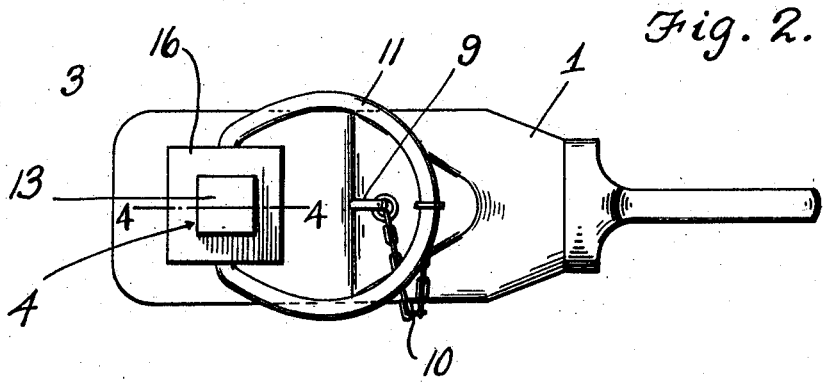
Fig. 2 is a plan view thereof.
Figure 3:
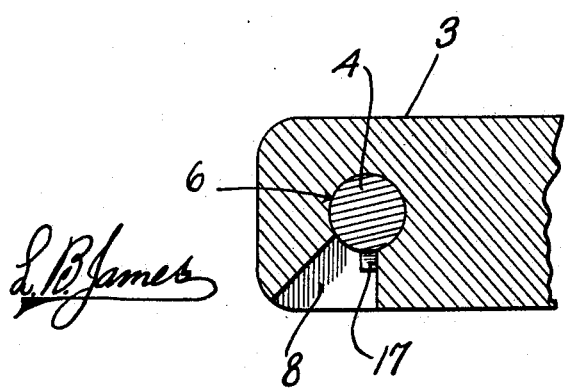
Fig. 3 is a sectional view approximately on the line 3—3 of Fig. 1.

In the drawings, a clevis or coupling is broadly indicated by the numeral 1. The lower jaw of the clevis is indicated by the numeral 2, and the upper jaw by the numeral 3. Both of these jaws have alining round openings for the reception of a cross sectionally round locking pin 4. The upper jaw 3, on its outer face is provided with a square depression 5 that surrounds the pin opening 6 therein. At one of the corners of the lower wall provided by the depression there is a notch 7 that communicates with one of the end walls provided by a slot 8, the said slot being formed from one of the sides of the jaw 3.

On the upper jaw 3, to the rear of the pocket formed by the depression 5, there is an eye 9 to which is secured one of the end links of a comparatively light chain 10. The outer link of the chain is loosely connected to a ring 11. This ring is provided with a widened portion 12 which is in the nature of a bit, and will hereinafter be referred to as such. In transverse cross section, the bit 12 may be of the same diameter as the ring proper, while in longitudinal cross section, the bit portion of the ring is of a diameter approximately double that of the ring proper. The widened or bit portion of the ring may be of a length approximately equaling one-half of the diameter of the ring, or even greater. The outer end of the pin is square as indicated by the numeral 13, and the said squared end has an elongated preferably key hole slot 14 therethrough, through which the locking ring is received. It will be apparent that the locking ring, when the smaller diameter of the bit is brought in the restricted passage of the key hole slot may be moved longitudinally on the pin and when the ring is turned to bring the bit into the wider passage of the key hole slot, such movement of the ring will be prevented. The bit portion of the ring also passes through a round opening 15 which is arranged transversely through a block 16. The block is square in plan and is of a size to be snugly received in the pocket provided by the depression 5. The block has a square bore that receives the squared end of the pin, and the length of the slot in the pin is sufficient to permit of the block being arranged with the ring, when the latter is swung to bring the smaller diameter of its bit portion in a line with the restricted passage in the key hole slot in the said pin.

One of the sides of the rounded portion of the pin, adjacent to the squared end thereof has an outstanding lug 17 thereon. The lug is of a size to be received through the notch 7 and enter the slot 8. The pin is then turned to bring the lug fully within the slot and away from the notch. The lug is arranged on the pin in a line with the key hole slot in the squared end of the pin, and when the pin is turned to bring the lug to the position above set forth, the block is lowered into the pocket, and is brought into contacting engagement with the walls provided by said pocket. The ring is then turned so that the greater diameter of the bit portion thereof will be received in and arranged transversely with respect to the widened lower passage provided by the elongated slot in the pin. This locks the pin between the jaws of the clevis or coupling, and the pin cannot be accidentally released until the ring is swung to a vertical position and a pressure thereon is exerted to draw the same outward of the key hole slot, and thus lift the locking block to permit of the turning of the pin to bring the lug 17 out of the slot 8 and through the notch 7. The widened diameter of the bit portion of the ring exerts a frictional engagement between the walls provided by the passage in the notch and the walls provided by the passage in the key hole slot. Also the ring, when in locking position is disposed at a slight downward angle with respect to the clevis or coupling, as clearly disclosed by the drawings, so that the liability of the upward swinging of the ring will be thus successfully prevented.

It is believed that the foregoing description, when taken in connection with the drawings will fully set forth the construction and advantages thereof to those skilled in the art to which such inventions relate, but it is to be understood that the showing and description refer only to a satisfactory embodiment of the improvement as it now appears to me, and that such changes may be made therefrom as fall within the scope of what is claimed.

Having described the invention, we claim:—

1. In combination with the clevis or coupling having spaced open jaws and round alining openings therethrough, said upper jaw having a square pocket surrounding the opening therein, the lower wall of the pocket having a notch and the jaw having a transverse slot communicating with the notch, a locking pin slidable through the openings in the jaws, a lug thereon designed to enter the notch and slot when the pin is turned to one position on the clevis, slidable means on the pin received in the pocket and contacting with the walls thereof, when the pin is in its last mentioned position, and swinging means for locking the slidable means on the pin and in the pocket.

2. In combination with a clevis or coupling having spaced open jaws provided with alining round openings, the upper jaw having a square depression forming a pocket that surrounds the opening therein and the lower wall of the pocket having a notch and the side wall of the jaw having a slot communicating with the notch, a coupling pin movable through the openings in the jaws, a lug thereon designed to be received in the notch and to enter the slot, when the pin is turned on the clevis or coupling, said pin having a square extension provided with a key hole slot, a block slidable on said extension and designed to be received in the pocket, and a ring member having a bit portion passing transversely through the block and through the key hole slot in the pin and designed, when the block is in the pocket to be turned to bring the bit thereof transversely in the widened passage of the key hole slot in a position to bridge the restricted passage of the said slot.

In testimony whereof we affix our signatures.

WILLIAM R. FREEMAN.
JAMES M. FREEMAN.